Dec. 29, 1964  T. F. WIDMER ETAL  3,163,583
FUEL FOLLOWER FOR A HETEROGENEOUS NUCLEAR REACTOR
Filed Sept. 6, 1960  4 Sheets-Sheet 4

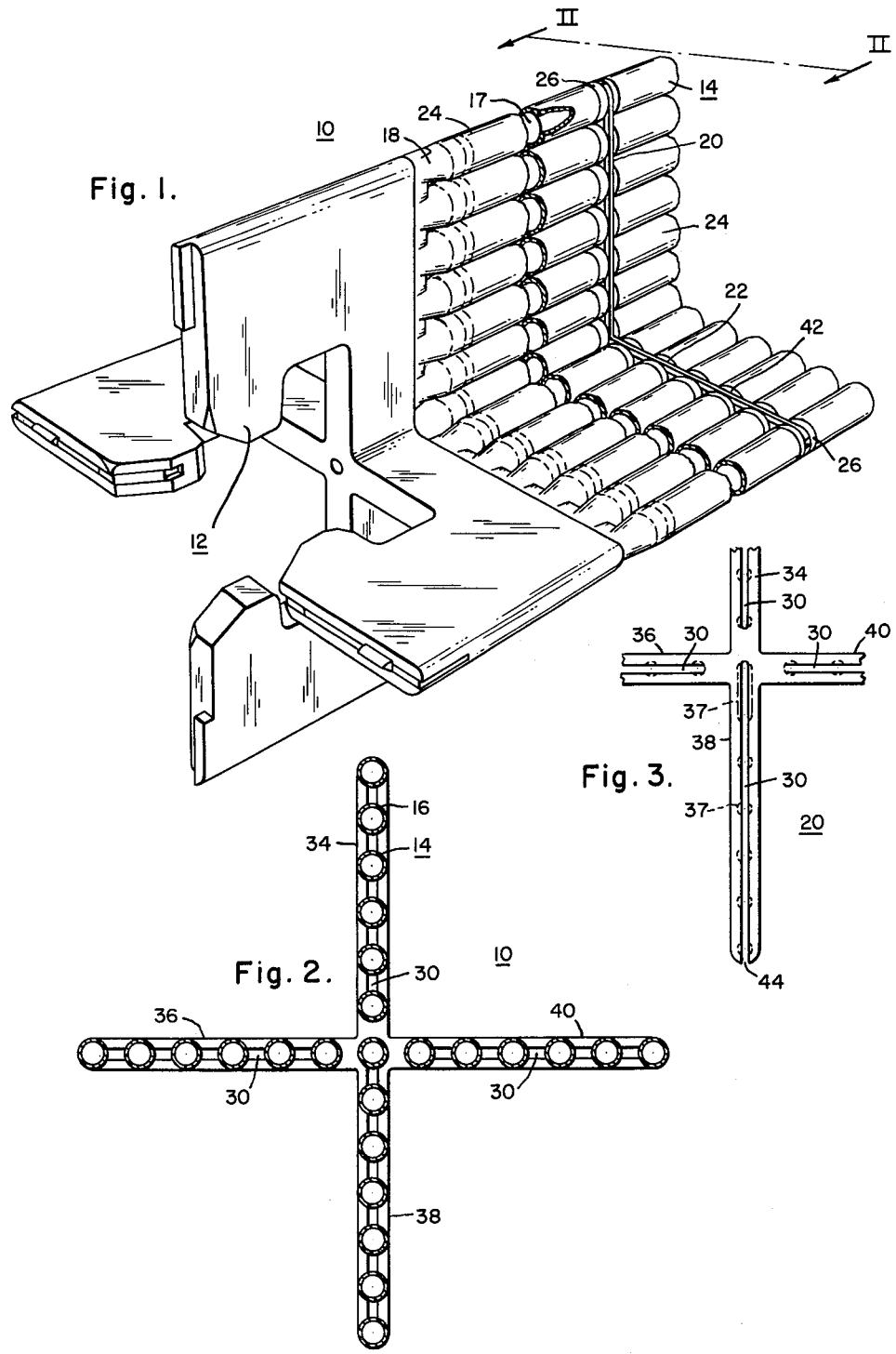

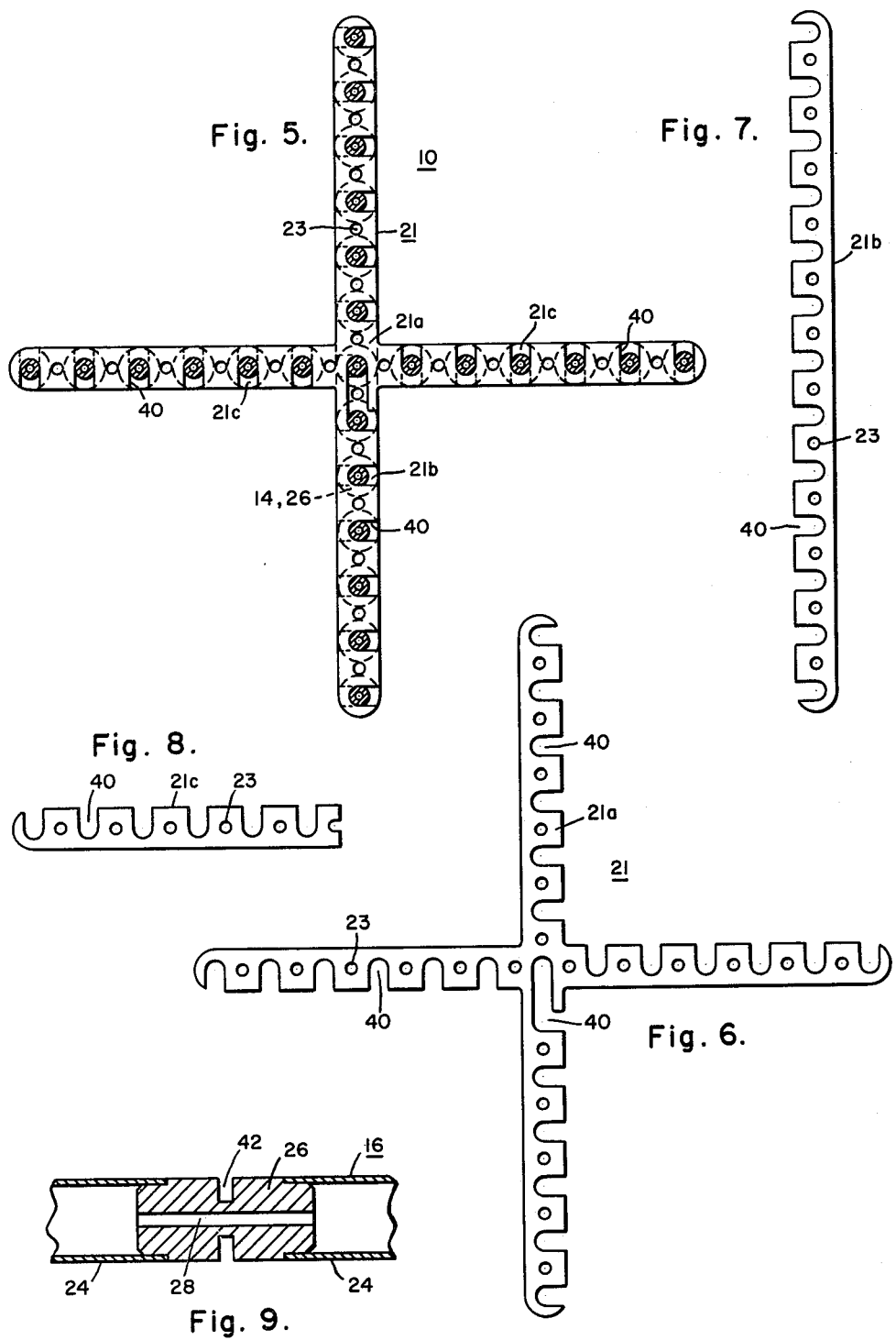

United States Patent Office 3,163,583
Patented Dec. 29, 1964

3,163,583
FUEL FOLLOWER FOR A HETEROGENEOUS
NUCLEAR REACTOR
Thomas F. Widmer, Monroeville, and Edward Paxson,
Forest Hills, Pa., assignors to Westinghouse Electric
Corporation, East Pittsburgh, Pa., a corporation of
Pennsylvania
Filed Sept. 6, 1960, Ser. No. 53,934
10 Claims. (Cl. 176—40)

The present invention relates to heterogeneous fuel arrangements for nuclear reactors and more particularly to such arrangements in which movably positioned control rods are provided with a follower device for inhibiting flux peaking ordinarily associated with withdrawal movement of the rods.

In a heterogeneous nuclear reactor, a plurality of elongated fuel elements are usually arranged in the form of an array or an assembly, with elongated channels being provided for longitudinal movement of neutron absorbing rods in controlling or in discontinuing an existing nuclear chain reaction. Channels are also provided for circulating a cooling fluid, with a desired rate of flow, along the various fuel elements for purposes including that of extracting generated energy for external use.

The cooling fluid or coolant generally is free to enter that portion of each control rod channel which is unoccupied by the control rods. This being the case, withdrawal of the control rods leads to an entry of a supplanting quantity of the coolant into the control rod channels to occupy the resulting vacancy unless steps are taken to avoid this effect. Whether such an effect is undesirable and is therefore to be avoided depends to a large extent upon the moderating capacity of the coolant, for any perturbation or peaking of fission producing neutron flux in the vicinity of the space vacated by the control rods is a function of the moderating effect of the coolant in slowing fast neutrons to lower energy levels, for example, thermal energy levels where neutrons of such energy levels are being employed to propagate the nuclear chain reaction.

As an elementary matter, peaking in the neutron flux leads to a greater localized rate of reactivity and a consequent temperature rise of the surrounding structural and other reactor materials. Such rises in temperature result in "hot spots" which can lead to damaging effects and are therefore desirably to be eliminated. Moreover, with the presence of flux peaking, the average thermal operating level of the reactor is necessarily maintained below its design limit; and with the removal or minimization of flux peaking, the average thermal operating level and therefore the total energy output can be raised to approach its design limit without danger of causing any failure in the reactor as a result of "hot spots." In this connecton, a follower device of a material having relatively low neutron absorption cross-section, such as a zirconium alloy or stainless steel, can be attached to the inner end of each control rod so as to follow the withdrawal movement of the rods and thereby occupy, at least partially, the space vacated by the rods. If the moderating capacity and the coolant displacement function of the followers are properly correlated, perturbations or peaking of neutron flux can be reduced.

If the follower itself is provided with fuel bearing material, flux peaking can be reduced or avoided with less neutron absorption as well as with other benefits and, therefore, with a greater degree of efficiency, particularly where a proper geometry is provided for the fuel. For reasons which will subsequently become more apparent, both uniform fuel distribution or neutron flux gradient across the assembly and maintenance of freedom in control rod movement are to be considered as functional guide posts in providing a fuel follower for a control rod.

Thus, it is an object of the invention to provide a novel fuel bearing follower for a control rod in a nuclear reactor so as to increase the energy output of the reactor.

It is another object of the invention to provide a novel fuel bearing follower for a control rod in a nuclear reactor so as to minimize or avoid flux perturbations upon withdrawal of the control rod.

A further object of the invention is to provide a novel fuel bearing follower for a control rod in a nuclear reactor providing uniformity in fuel distribution across the reactor upon withdrawal movement of the control rod so as both to minimize or avoid flux perturbations and so as to increase the energy output of the reactor.

It is an additional object of the invention to provide a novel follower for a control rod in a nuclear reactor so as to obtain any or all of the preceding objects and so as substantially to preclude the resulting control rod assembly from being jammed against movement notwithstanding the presence of mechanical or thermal or other forces which might otherwise cause a jamming effect to occur.

Another object of the invention is to provide a novel fuel follower for a control rod in a nuclear reactor comprising a plurality of elongated fuel elements with means being provided for supporting these elements relative to the control rod and relative to each other so as to enable the elements to be restrained from lateral deformation with a minimum of force and to deform longitudinally in response to thermal or other forces.

These and other objects of the invention will become more apparent upon consideration of the following detailed description of the invention along with the attached drawings, in which:

FIGURE 1 is a partial perspective view of a fuel follower fabricated in accordance with the principles of the invention;

FIGURE 2 is a cross-sectioned view taken along the reference line II—II of FIG. 1;

FIGURE 3 is a partial top plan view of a securing member used as a part of the follower of FIG. 1;

FIGURE 5 is a cross-sectioned view taken along the reference line V—V of FIG. 4;

FIGURE 6 is a top plan view of a portion of the securing member used as a part of the fuel follower of FIG. 4;

FIGURE 7 is a top plan view of another portion of the securing member used as a part of the follower of FIG. 4;

FIG. 8 is a top view of still another portion of the securing member used as a part of the follower of FIG. 4;

FIGURE 9 is a cross-sectioned view taken partially along the reference line IX—IX of FIG. 4;

Figure 4:
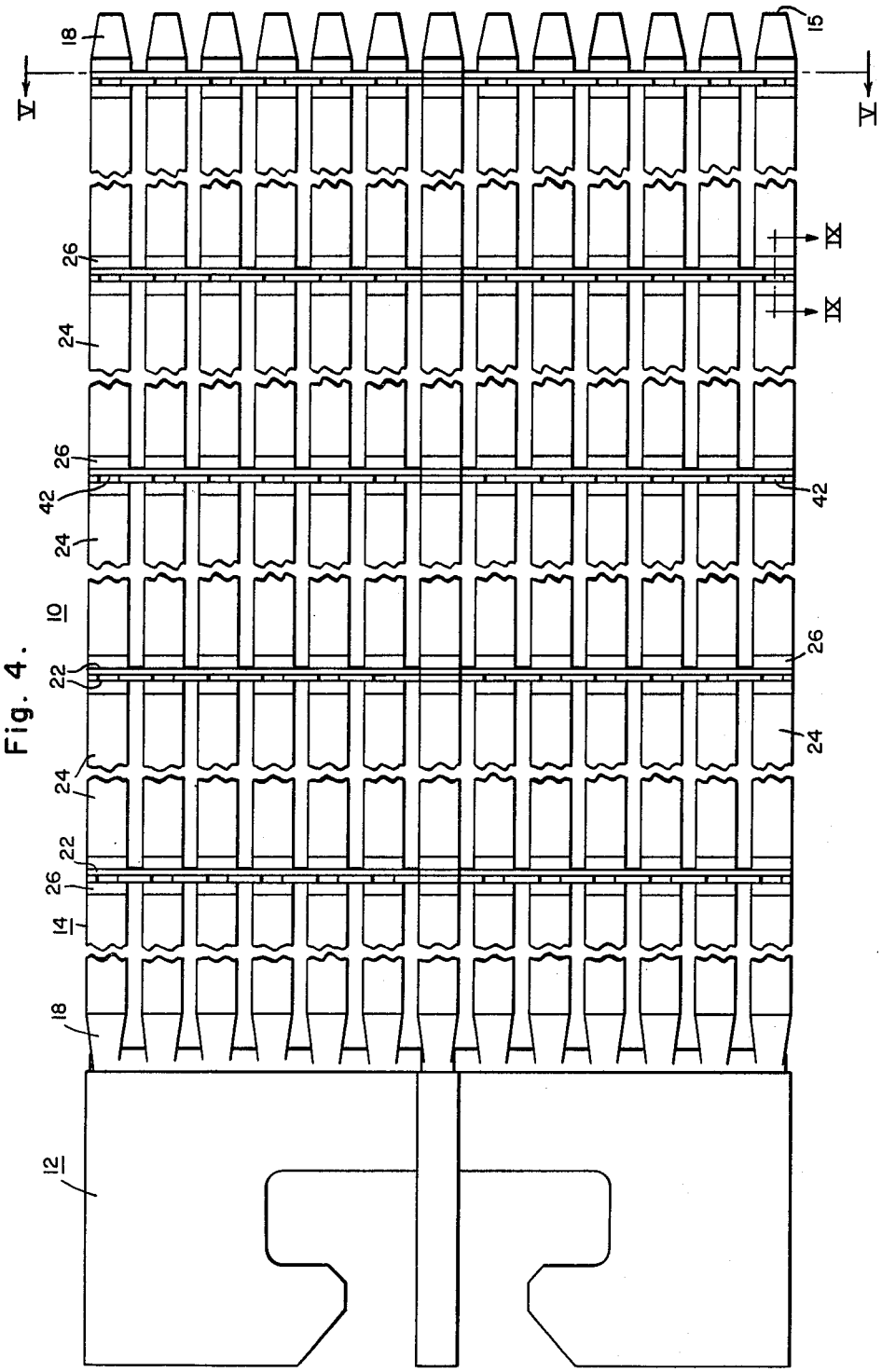
FIGURE 4 is an elevational view, with portions being removed, of a control rod follower similar to the one shown in FIG. 1 but having a plurality of different securing members.

With reference to FIGS. 1 and 2, a fuel follower 10 is provided for use in a heterogeneous fuel arrangement or core (not shown) of a nuclear reactor (not shown). For example, the follower 10 can be secured to a control rod for use in conjunction with a group of elongated fuel assemblies comprising an array of elongated fuel elements, such as that described in a copending application of R. J. Creagan, filed Sept. 27, 1957, Serial No. 686,778, now abandoned entitled "Neutronic Reactor" and assigned to the present assignee. Means including a latching member 12, of a suitable structural material such as stainless steel, are provided for securing the follower 10 in aligned relation with an elongated control rod which is supported for longitudinal movement along a channel in the employed fuel assembly. For a full description of the securing means just noted, reference is to be made to a copending application of E. Frisch and C. G. Johnson, filed July 22, 1957, Serial No. 673,533, now U. S. Patent 3,034,814, entitled "Coupling," and assigned to the present assignee.

Design considerations are determinative of the lateral outer contour or envelope of each control rod associated with the fuel assembly and, accordingly the inner envelope of each control rod channel in the fuel assembly. In this example of the invention, the follower 10 is generally provided with a cruciform lateral envelope for conformity in use with a cruciform control rod comprising elongated, laterally intersecting plates of a neutron absorbing material, such as an alloy of hafnium and cadmium.

It is desirable that the control rod outer envelope generally conform in outline with the rod channel inner envelope and that the former be only marginally smaller in size than the latter. In such a case, the fuel inventory for criticality and for the desired operational power level can be relatively minimized for reasons including the fact that flux peaking is then generally inhibited and the fact that the fuel elements can then be distributed uniformly in close relation.

Where the dimensional parameters of the control rod and its follower are as critical as those just described, any lateral or bowing deformation of a control rod or its follower might jam one or the other of these members against adjacent structure of the fuel assembly, for example adjacent fuel elements. Such a result could lead to substantial damage, particularly if a full insertion or a "scram" of all the control rods is demanded by emergent circumstances. It is, therefore, essential that the forces necessary to restrain the lateral or bowing deformation of each of the control rods and the followers be reduced to a minimum or that the lateral or bowing deformation be eliminated altogether. It is to be noted that the inherent strength provided by the structural form of the cruciform control rod being exemplarily considered here contributes toward this end.

To obtain the objective of uniform distribution of the fuel inventory so as generally to inhibit or avoid flux peaking effects, a fuel follower for a control rod should provide a cross-sectional distribution of fuel substantially equivalent to the cross-sectional distribution of fuel elsewhere in the previously noted fuel assembly. Thus, the space vacated by withdrawal movement of the control rod can then be occupied by the fuel follower to provide substantial uniformity in the distribution of the fuel inventory as taken cross-sectionally through the follower. It is, therefore, possible to minimize or avoid control channel flux peaking which exists, perhaps most pronouncedly, where no follower is employed and which exists, probably to a lesser degree, where an employed follower bears no fuel or where an employed fuel follower is provided with a cross-sectional form introducing a non-conforming fuel distribution.

In this embodiment of the invention, the follower latching member 12 is generally of cruciform outline for conformity with the cruciform control rod being considered here and for conformity with the cruciform control rod channels provided therefor and extending in generally parallel directions among adjacent fuel assemblies of the core, as described in the Creagan application noted above. To avoid or minimize flux peaking in this example of the invention and to provide for uniformity of the fuel inventory where a plurality of elongated, in this instance tubular, fuel elements form the aforementioned fuel assembly, means are provided for supporting in spaced relation a plurality of elongated fuel rods 14 relative to the latching member 12 and relative to each other. Of course, the lateral envelope of the fuel rods 14 is generally of the cruciform type for conformity with the latching member 12, and the spacing between the fuel rods 14 provides for proper circulation of the coolant. Generally, each rod 14 comprises a tubular cladding member 16 of a suitable material such as stainless steel, with fissionable material, for example uranium dioxide enriched if desired with $U^{235}$, being placed, preferably in the form of pellets 17, within the cladding member 16. Further description of the fuel rods 14 will be presented subsequently.

As part of the aforementioned supporting means, the latching member 12 can be provided with recesses (not shown) into which an end plug 18 of the respectively adjacent fuel rods 14 can be inserted and secured by any suitable means, such as by welding or with the use of supporting pins. Considering operative movement of the follower 10 to be in the vertical direction, it is clear that, without additional support, the rods 14, as thus far described, are merely suspended from the latching member 12 and are generally free to undertake lateral movement relative to each other.

To hold the rods 14 against this lateral movement while avoiding the objectionable jamming effects already considered as ordinarily resulting from overall lateral or bowing deformation of a control rod follower, the aforementioned supporting means also include a plurality of securing or strap members 20, falling within the cruciform contour of the fuel rods 14 and being spaced along the length of the fuel rods 14 and being secured to the fuel rods 14 by any suitable means, such as by welding as indicated by the reference character 22. A suitable fixture can be employed for holding the fuel rods 14 during the welding operation if this operation is employed.

The cladding member 16 of the fuel rods 14 can, as in this example, be divided into a plurality of segments 24, with adjacent segments 24 being joined, as by welding, through a plug 26 (as most clearly observed in FIG. 9). In this manner, the probability of jamming of the fuel pellets 17 within the cladding member 16 is relatively minimized since the full column of pellets 17 is then divided into shorter columns in tandem relation with the plugs 26, and, just as importantly, the securing of the straps 20 to the fuel rods 14 can be accomplished generally without leading to damage of the cladding member 16. Of course, each fuel rod 14 is provided with a plug 26 for securance (22) to each strap 20.

If desired, a hole 28 (FIG. 9) can be provided axially through the plugs 26 so as to equalize fission gas pressure among the various segments 24 of each fuel rod 14. As another notable point, the plugs 26, of a material such as stainless steel, generally strengthen the fuel rods 14. Where the wear of the fuel rods 14 during operation of the follower 16 is expected to be significant enough for consideration, the cladding member 16 can be provided with added thickness as an offsetting measure.

The strap 20 is most clearly observed in FIG. 3. In this embodiment of the invention, the strap 20 comprises a unitary member of a cruciform shape having an elongated slot 30 in each arm 34 or 36 or 38 or 40. The slot 30 in the strap arm 38 is extended to a position centrally of the strap 20 to enable a fuel rod 14 to be located centrally of the follower 10.

For the purpose of obtaining mating engagement of the fuel rods 14 with the straps 20, a groove 42 (FIG. 9) is provided in each plug 26 of the fuel rods 14. Thus, to position the fuel rods 14 and the straps 20 relative to each other, each rod plug 26 is inserted through an open end 44 of a strap arm 34 or 36 or 38 or 40 and is guided along the associated slot 30 until properly located. In this insertional movement, opposite sides of the plug grooves 42 slide along opposite sides of the arms 34, 36, 38 and 40.

If desired, notches or arcuate portions 37, shown in dotted lines in FIG. 3, can be removed from the arms 34, 36, 38 and 40 to provide for an alternate assembly of the fuel rods 14 with the straps 20. In such a case, the fuel rods 14 would be passed laterally through the removed arcuate portions 37 of the arms 34, 36, 38 and 40 to deflect the edges of these arms adjacently of the slots 30, which edges subsequently snap into the rod plug grooves 42 to hold the rods 14 in position. In addition, where the arcuate portions 37 are removed, the fuel rods 14 become indexed against movement along the longitudinal dimension of the slots 30. In either of the two cases just considered, the straps 20 can be selected in number to determine the desired strength of the follower 10, and all of these members can be secured together as a unit in the manner previously described.

As another example of a securing member or strap that can be employed, a strap 21, shown in FIGS. 5 through 8, comprises a cruciform member 21a having lateral slots 40 for receiving the rod plugs 26. In addition, a strip 21b is provided to be slipped into the plug grooves 42 of the fuel rods 14 over the arms of the cruciform member 21a along one of its axes so as to provide holding forces against withdrawal of the rods 14 outwardly of the lateral slots 40. A shorter strip 21c is provided for engagement with the fuel rods 14 over each arm of the cruciform member 21a along its other axis. In certain applications, the thickness of the rod grooves 42 might have to be made relatively greater for engagement with the straps 21 as compared to the case of the straps 20. Again, these members can be placed in secured relation as a unit in the manner previously described.

As previously noted, to preclude jamming of a follower and its adjoining control rod, bowing or lateral deformation of each of these members must be eliminated substantially altogether or, if not eliminated, then the forces necessary to restrain such deformation, or to restore substantially normal form to the laterally or bowingly deformed member, must be relatively minimized. In the latter two instances, jamming effects are avoided for reasons including the fact that frictional or drag forces against control rod movement are then tolerably valued. For notation purposes, bowing or lateral deformation of a follower can be caused by various forces including thermal forces generated as a result of a temperature differential existing across the follower. Such a temperature differential can arise, and ordinarily would arise in most reactors, a result of either a uniform or a non-uniform gradient of neutron flux across the follower.

In the instance of the fuel follower 10, lateral or bowing deformation is not entirely precluded because each of the fuel rods 14 is not absolutely free to undertake differential axial expansion independently of the other fuel rods 14. For example, where axially directed thermal forces are applied to the fuel rods 14 differentially across the follower 10, a bowing moment is resultingly applied to the follower 10 and some bowing occurs since the straps 20 or 21 tensionally oppose, only to a limited extent however, free axial expansion of the fuel rods 14, particularly those rods 14 subjected to greater axial forces.

It is significant, on the other hand, that only relatively minimal external forces are required to restore the follower 10 to substantially normal form or to restrain the follower 10 from bowing or deforming laterally in the first place. In an operating reactor, such forces might originate, as an example, in the structural material surrounding the control rod channel in which the follower 10 is located. Since the straps 20 or 21 have a relatively low section modulus against shearing forces in the longitudinal direction of the follower 10, shearing components of the exemplified external forces would cause the straps 20 to bend as required to enable the various fuel rods 14 to elongate in preference to bowing. Since a remote end 15 (FIG. 4) of each rod 14 is free, such elongation is not otherwise prevented. In the particular case of the straps 21, holes 23 can be provided both for reducing section modulus against shear and for improving conditions for coolant flow. It follows, therefore, that the means for supporting the follower rods 14, which bear fuel in this example, substantially preclude the rods 14 from jamming and, therefore from interfering with freedom of control rod movement since the relatively minimal restoring or restraining forces applied to the follower 10 will be operative, at worst, only to induce a relatively minimal frictional effect upon control rod movement.

Figure 10:
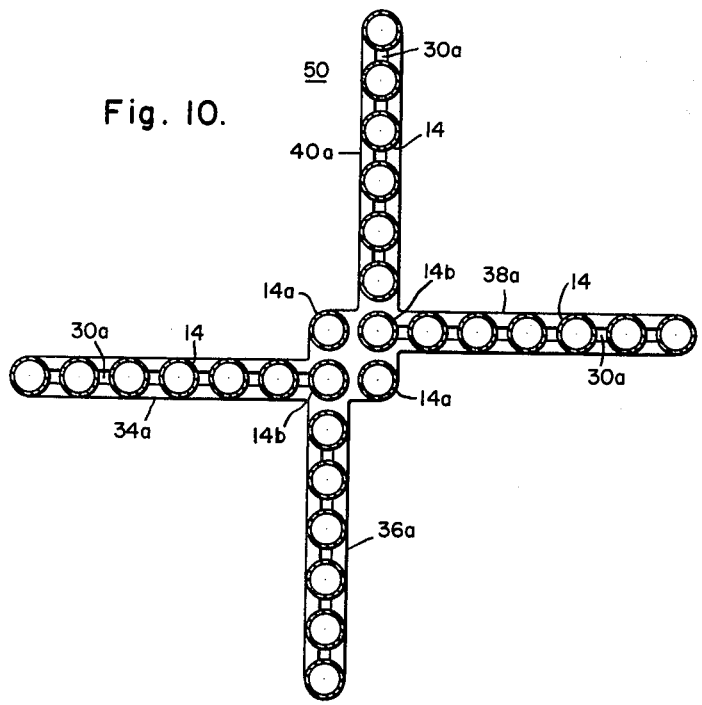
FIGURE 10 is a cross-sectional view of a control rod follower similar to the one shown in FIG. 2 but having its opposed arms laterally offset from each other; and, FIGURE 11 is a partial top plan view of the offset portion of the securing member used as part of the follower of FIGURE 10.
Figure 11:
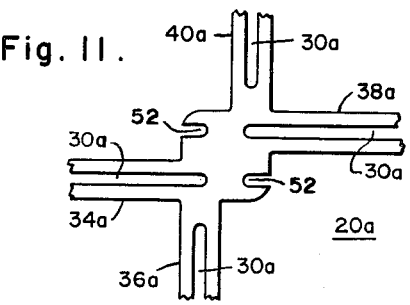

In FIG. 10, an alternate fuel follower 50 is provided for another form of control rod which has a cross-section generally of the cruciform type but which has its opposed arms laterally offset from each other. Such a control rod has a somewhat greater degree of inherent strength than does a rod of exact cruciform outline. Moreover, by conforming the follower 50 in lateral outline with such a control rod, additional benefits are obtained including the fact that handling of the follower during the assembly procedure is facilitated since added stability is provided.

The supporting means for the fuel rods 14 in the follower 50 include a plurality of axially spaced straps 20a, with each having offset arms 34a, 38a and 36a, 40a and with each of the latter having a slot 30a. In addition, slots 52 are provided for centrally located fuel rods 14a since only centrally located fuel rods 14b and the remainder of the fuel rods 14 are accommodated by the slots 30a. By first attaching the rods 14a and 14b to the straps 20a, a stable subassembly is provided to which the rods 14 can be subsequently secured in a ready manner.

In the foregoing description, several physical arrangements have been presented only to point out the principles of the invention. The description, therefore, has been only illustrative of the invention, and, accordingly it is desired that the invention be not limited by the embodiments described here but, rather, that it be accorded an interpretation consistent with the scope and spirit of its broad principles.

What is claimed is:

1. In a nuclear reactor, a follower for an elongated control rod employed therein, said follower comprising a plurality of elongated fuel elements forming a lateral envelope substantially conforming to that of said control rod, means for supporting said fuel elements relative to said control rod and relative to each other, said supporting means including a plurality of resilient elongated straps, said straps extending laterally of said fuel elements and being spaced along the length thereof, and said straps enabling differential longitudinal deformation of said fuel elements to preclude said follower from jamming against adjacent structure.

2. In a nuclear reactor having an assembly of elongated fuel rods providing a lateral distribution of fuel according to a given pattern, a follower for an elongated control rod with the latter being disposed for axial movement through a channel in said assembly, said follower comprising a plurality of elongated fuel rods forming a lateral envelope substantially conforming to that of said control rod and having their longitudinal axes laterally spaced from each other, and means for supporting said fuel rods of said follower relative to said control rod and relative to each other, said fuel rods of said follower providing a lateral distribution of fuel substantially conforming to that of said fuel assembly for the purpose of maintaining substantial uniformity in the neutron flux gradient across said assembly upon withdrawal of said control rod.

3. In a nuclear reactor, a follower for an elongated control rod employed therein, said follower comprising a plurality of elongated fuel elements forming a lateral envelope substantially conforming to that of said control rod, means for supporting said fuel elements relative to said control rod and relative to each other, said supporting means including a plurality of resilient elongated straps, said straps extending laterally of said fuel elements and being spaced along the length thereof, each of said straps including an elongated slot extending from at least one of its free ends inwardly and longitudinally thereof to a limited extent, each of said fuel elements having a plurality of spaced laterally extending grooves for engagement of said fuel elements with said straps through said slots.

4. In a nuclear reactor, a follower for an elongated control rod employed therein, said follower comprising a plurality of elongated fuel elements forming a lateral cruciform envelope substantially conforming to that of said control rod, means for supporting said fuel elements relative to said control rod and relative to each other, said supporting means including a plurality of resilient elongated straps, said straps extending laterally of said fuel elements and being spaced along the length thereof, the outer lateral envelope of said straps being within the lateral cruciform envelope of said fuel rods, and said straps enabling differential longitudinal deformation of said fuel elements to preclude jamming of said follower against adjacent structure.

5. In a nuclear reactor, a follower for an elongated control rod employed therein, said follower comprising a plurality of elongated fuel elements forming a lateral envelope substantially conforming to that of said control rod, means for supporting said fuel elements relative to said control rod and relative to each other, said supporting means including a plurality of resilient elongated straps, said straps extending laterally of said fuel elements and being spaced along the length thereof, each of said straps including an elongated slot extending from at least one of its free ends inwardly and longitudinally thereof to a limited extent, each of said fuel elements comprising a plurality of segments in tandem relation with adjacent segments being joined together by a plug, each of said plugs having a lateral groove for mating engagement of said fuel elements with said straps through said slots.

6. In a nuclear reactor, a follower for an elongated control rod employed therein, said follower comprising a plurality of elongated fuel elements forming a lateral envelope substantially conforming to that of said control rod, means for supporting said fuel elements relative to said control rod and relative to each other, said supporting means including a plurality of resilient elongated straps, said straps extending laterally of said fuel elements and being spaced along the length thereof, each of said straps including at least one elongated member having a plurality of slots extending laterally inwardly from one edge of said strap to a limited extent and including at least one other elongated member having a plurality of slots extending laterally inwardly from the opposite edge of said strap to a limited extent, each of said fuel elements having a plurality of spaced laterally extending grooves for latching engagement of said fuel elements with said straps through said slots.

7. In a nuclear reactor, an elongated control rod having a generally cruciform lateral contour but having its opposite arms laterally offset from each other, respectively, a follower having a generally cruciform lateral contour to conform with said control rod, said follower comprising a plurality of elongated fuel rods forming opposite arms being laterally offset yet overlapping each other to provide added stability for an inner axial portion of said follower, and means for supporting said fuel rods relative to each other and relative to said control rod.

8. In a nuclear reactor, an elongated control rod having a generally cruciform lateral contour but having its opposite arms laterally offset from each other, respectively, a follower having a generally cruciform lateral contour to conform with said control rod, said follower comprising a plurality of elongated fuel rods forming opposite arms being laterally offset yet overlapping each other to provide added stability for an inner axial portion of said follower, and means for supporting said fuel rods relative to each other and relative to said control rod, said supporting means including a plurality of resilient elongated straps, said straps extending laterally of said fuel rods and being spaced along the length thereof, and said straps enabling differential longitudinal deformation of said fuel rods to preclude said follower from jamming against adjacent structure.

9. In a nuclear reactor, a follower for an elongated control rod employed therein, said follower comprising a plurality of elongated fuel elements forming a lateral envelope substantially conforming to that of said control rod, means for supporting said fuel elements relative to said control rod and relative to each other, said supporting means including a plurality of resilient elongated straps, said straps extending laterally of said fuel elements and being spaced along the length thereof, each of said straps including an elongated slot extending from at least one of its free ends inwardly and longitudinally thereof to a limited extent, each of said fuel elements having a plurality of spaced laterally extending grooves for engagement of said fuel elements with said straps through said slots, and a plurality of notches being spaced along the slot of each of said straps and extending outwardly thereof for the purpose of locating said fuel elements relative to said straps.

10. In a nuclear reactor, an elongated control rod, a follower generally conforming in lateral contour with said control rod, said follower comprising a plurality of elongated fuel rods, means for supporting said follower relative to said control rod and means for laterally joining said fuel rods relative to each other, said lateral joining means being spaced along the length of said fuel rods and enabling differential elongation of said fuel rods to preclude said follower from jamming against adjacent structure.

References Cited in the file of this patent

UNITED STATES PATENTS 2,857,324    De Boisblanc et al.   ------ Oct. 21, 1958

FOREIGN PATENTS 817,265    Great Britain   ----------- July 29, 1959

OTHER REFERENCES

"Proceedings of 2nd U.N. Conf. on Peaceful Uses of Atomic Energy," 1958, vol. 6, p. 635, publ. by U.N.